(12) United States Patent
Bates et al.

(10) Patent No.: US 6,944,443 B2
(45) Date of Patent: Sep. 13, 2005

(54) METHOD, APPARATUS AND SYSTEM FOR NOTIFYING A USER OF A PORTABLE WIRELESS DEVICE

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 09/903,329

(22) Filed: Jul. 11, 2001

(65) Prior Publication Data

US 2003/0013456 A1 Jan. 16, 2003

(51) Int. Cl.[7] .............................................. H04M 11/04
(52) U.S. Cl. .............................. 455/414.2; 455/404.2; 455/456.3; 340/903; 701/214
(58) Field of Search ........................ 455/404.1, 404.2, 455/414.1, 414.2, 456.1–457; 340/903, 988–996; 701/213–214

(56) References Cited

U.S. PATENT DOCUMENTS

| | | | | |
|---|---|---|---|---|
| 5,479,482 A | * | 12/1995 | Grimes | 455/556.1 |
| 5,689,809 A | * | 11/1997 | Grube et al. | 455/457 |
| 6,292,672 B1 | * | 9/2001 | Chavez, Jr. | 455/519 |
| 6,292,747 B1 | * | 9/2001 | Amro et al. | 701/213 |
| 6,321,091 B1 | * | 11/2001 | Holland | 455/414.2 |
| 6,342,517 B1 | * | 1/2002 | Esch et al. | 514/422 |
| 6,424,910 B1 | * | 7/2002 | Ohler et al. | 701/202 |
| 6,539,232 B2 | * | 3/2003 | Hendrey et al. | 455/456.1 |
| 6,542,748 B2 | * | 4/2003 | Hendrey et al. | 455/456.1 |
| 6,553,236 B1 | * | 4/2003 | Dunko et al. | 455/457 |
| 6,618,593 B1 | * | 9/2003 | Drutman et al. | 455/456.3 |

OTHER PUBLICATIONS http://www.dodgeball.com/social/index.php, pp. 1–2, date unknown.
"http://www.attwireless.com/press/releases/2002_releases/062402.jhtml;dsessionid= QBJPBWISJT . . . " Mar. 10, 2004, pp. 1–3.

* cited by examiner

*Primary Examiner*—Stephen D'Agosta
(74) *Attorney, Agent, or Firm*—Moser, Patterson & Sheridan, LLP (57) ABSTRACT

A method, apparatus and system for notifying a user of a portable communication device. In one embodiment, a location of a first portable communication device is determined for a first user and the location of a second portable communication device is determined for a second user. A determination is made as to whether the location of the second portable communication device is within a same region containing the first portable communication device. If the second portable communication device is within the same region as the first portable communication device, then the first user is notified of the presence of the second user.

3 Claims, 5 Drawing Sheets

METHOD, APPARATUS AND SYSTEM FOR NOTIFYING A USER OF A PORTABLE WIRELESS DEVICE

BACKGROUND OF THE INVENTION

1. Field of the Invention

The invention relates to communications systems and devices. More particularly, the invention relates to a method, apparatus and system for notifying a user of a portable communication device.

2. Background of the Related Art

Portable communication devices offer tremendous flexibility over conventional land-based means of communications, e.g., telephone handsets. Examples of portable communication devices include mobile communication devices, e.g., a laptop computer, and wireless communication devices, e.g., wireless phones, personal digital assistant devices, and two-way pagers. These and other portable communication devices enable a user to communicate from various places other than a residence, office or payphone. One application of portable communication devices is the use of mobile phones in an emergency situation. For example, if a car breaks down on a freeway, the driver may use the wireless phone to contact local authorities or emergency personnel. Another use of wireless phones is to contact an operator when touring or visiting a city. For example, the user may contact the operator to obtain the locations of nearby tourist attractions and hotels.

To enhance the utility of wireless phones, the Federal Communications Commission (FCC) has mandated that service providers implement an enhanced 911 (E911) system by the end of the year 2001. The mandate also includes the implementation of a global positioning system (GPS) within each wireless phone. With the anticipated implementation of the GPS in wireless phones, there is a need to provide enhanced services for wireless phones and other GPS-based portable communication devices.

SUMMARY OF THE INVENTION

The invention provides a method, apparatus and system for notifying a user of a portable communication device. In one embodiment, a location of a first portable communication device is determined for a first user and the location of a second portable communication device is determined for a second user. A determination is made as to whether the location of the second portable communication device is within a same region containing the first portable communication device. If the second portable communication device is within the same region as the first portable communication device, then the first user is notified of the presence of the second user.

An apparatus, e.g., a portable communication device, comprising a position detector, a memory, a network interface and a processor is also provided. The position detector determines the location of the portable communication device. The memory stores a user alert program. The network interface is configured for the reception and transmission of information from a network. The processor, upon executing the user alert program, is configured to retrieve the location of the apparatus from the position detector, and determine the location of another portable communication device of another user from the information received via the network interface. The processor then determines whether the location of the other portable communication device is within the same region as the retrieved location. If the other portable communication device is within the same region as the retrieved location, the processor is further configured to notify the user of a presence of the other user.

A system for notifying a user of a portable communication device is also provided. The system comprises a first portable communication device, a second portable communication device and a network. The first portable communication device determines a location of the first portable communication device of a first user. The second communication device determines a location of the second portable communication device of a second user and transmits the determined location to the network. The network receives the transmitted location of the second portable communication device.

In different embodiments of the system, the network either transmit the received location to the first portable communication device, or determine whether the location of the second portable communication device is within the same area as the first portable communication device. If the network transmits the location, the first communication device determines whether the location of the second portable communication device is within the same area as the first portable communication device, and notifies the user of the first communication device if both devices are within the same region. If the network performs the determination, the network transmits a notification to the first wireless device of the first user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

A method, apparatus and system for notifying a user of a portable communication device is disclosed. In one embodiment, a location of a first portable communication device is determined for a first user and the location of a second portable communication device is determined for a second user. A determination is made as to whether the location of the second portable communication device is within a same region containing the first portable communication device. If the second portable communication device is within the same region as the first portable communication device, then the first user is notified of the presence of the second user.

Various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 1:
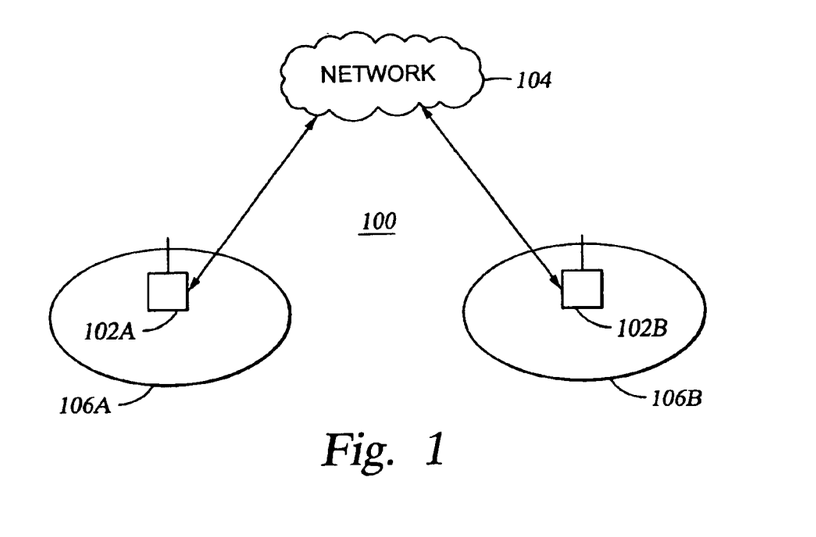
FIG. 1 depicts a system used for notifying a user of the presence of other group members.

FIG. 1 depicts a system 100 used for notifying a user of the presence of other users. In one embodiment, the user is notified of the presence of another user within the same group, i.e., another group member. Different users may be classified into various groups. For example, each user may categorize different groups of other users, e.g., groups of relatives, friends, co-workers, and the like.

In one embodiment, the system 100 comprises at least one portable communication device 102A and 102B and a network 104. The wireless communication device 102A may communicate or transfer information with the wireless communication device 102B or some other wireless communication device (not shown) via the network 104, or exchange information with the network 104. The following description will describe the portable communication device 102A and 102B with respect to the portable communication device 102A. However, the description similarly applies to other portable communication devices, e.g., 102B, in the system 100.

The portable communication devices 102A and 102B and the network 104 may transmit and receive different types of information in different data formats. Exemplary types of information may include text, voice, video, control signals, and the like. Exemplary data formats may include radio frequency (RF) signals and packetized signals.

The network 104 is used to transmit information with various portable communication devices, e.g., 102A and 102B. In one embodiment, the network 104 may comprise a collection of networks known as the Internet. Individual networks within the Internet may comprise a point to point network, e.g., a plain old telephone system (POTS) network, a broadcast network, e.g., a wireless or RF network, and the like. Transmission of information via the network 104 is performed in accordance with standard transmission formats, e.g., TCP/IP (Transmission Control Protocol/Internet Protocol), ATM (Asynchronous Transfer Mode), SONET (Synchronous Optical Network) and the like. In another embodiment, the network 104 may comprise a wireless communications system. This embodiment is further described with respect to FIG. 2.

The portable communication devices 102A and 102B (hereinafter referred to generally as 102) may comprise any two-way mobile device capable of receiving and transmitting information via the network 104. The portable communication devices 102 may be a mobile communication device or wireless communication device. One example of a mobile communication device is a laptop computer. Examples of wireless communication devices include a cellular phone, personal digital assistant (PDA) device, a two-way pager, and the like. Some portable communication devices 102, embodiments may also contain a global positioning system (GPS) as mandated by the Federal Communications Commission (FCC). The portable communication device 102 is further described with respect to FIG. 3.

With the inclusion of the GPS in the portable communication devices 102, one enhancement of the portable communication device 102 is to notify or alert a user of the presence of another user within the same region or area, e.g., 106A. Suppose the user of portable communication device 102A is a friend or relative of the user of portable communication device 102B. The two users live in different regions 106A and 106B but wish to meet with each other in person whenever possible. The portable communication device 102A enables such a meeting by notifying or alerting the user of the presence of the portable communication device 102B within the area 106A, which in turn indicates the presence of the user of communication device 102B in area 106A.

The above example is applicable to any group of two or more members. As such, if the user of the portable communication device 102A is in region 106A, the user of the portable communication device 102A is notified of the presence of another group member, e.g., the user of portable communication device 102B, in the same region 106A. The user of the other portable communication device 102B is also notified. Similarly, if the user of the portable communication device 102A enters another region 106B having another user with portable communication device 102B, both users of the portables communication devices 102A and 102B are notified of the presence of another group member in the same region, e.g., 106B. Additionally, a user of the portable communication device 102 may also have multiple groups of group members. For example, the user may have a first group for relatives, a second group for friends, and a third group for a professional association. The portable communication device 102 may selectively provide notification when members of each group enter the user's local region 106.

Figure 2:
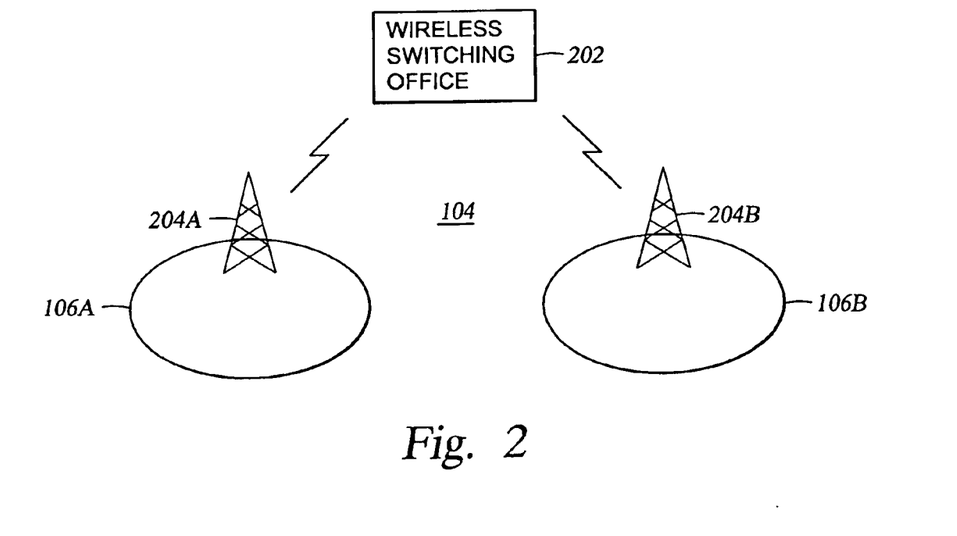
FIG. 2 depicts one embodiment of a network in the system of FIG. 1.

FIG. 2 depicts one embodiment of a network 104 of the system 100 of FIG. 1. In this embodiment, the network 104 is a wireless communications network. Specifically, the wireless communications network generally comprises at least one wireless switching office 202 and a plurality of communications towers 204A and 204B. Although one wireless switching office 202 and two communications towers 204A and 204B are illustratively depicted, FIG. 2 likewise applies to any number of switching offices 202 and communications towers 204A and 204B.

Each communications tower 204A and 204B is used to receive and transmit information, e.g., voice, text and video, between the wireless switching office 202 and all portable communication devices 102, e.g., wireless communication devices 102A and 102B in its respective area or region 106A and 106B. The information exchanged between the devices 102A and 102B and respective towers 204A and 204B may be in a form of a radio frequency (RF) signal or a packetized signal. Illustratively, communications tower 204A may receive and transmit information, e.g., in the form of data packets, between the wireless switching office 202 and all wireless communication devices, e.g., wireless communication device 102A, in region 106A. Similarly, communications tower 204B may receive and transmit information between the wireless switching office 202 and all wireless communication devices, e.g., wireless communication device 102B, in region 106B.

The wireless switching office 202 receives and transmits information from wireless communication devices 102A and 102B via respective communications towers 204A and 204B. The wireless switching office 202 also coordinates the transfer of information between various wireless communication devices, e.g., 102A and 102B. Namely, the wireless switching office 202 enables one wireless communication device 102A to send and receive information from another wireless communication device 102B. In one embodiment, the wireless switching office 202 receives information containing the location of wireless communication device 102B and transmits this information to another wireless communication device 102A.

Figure 3:
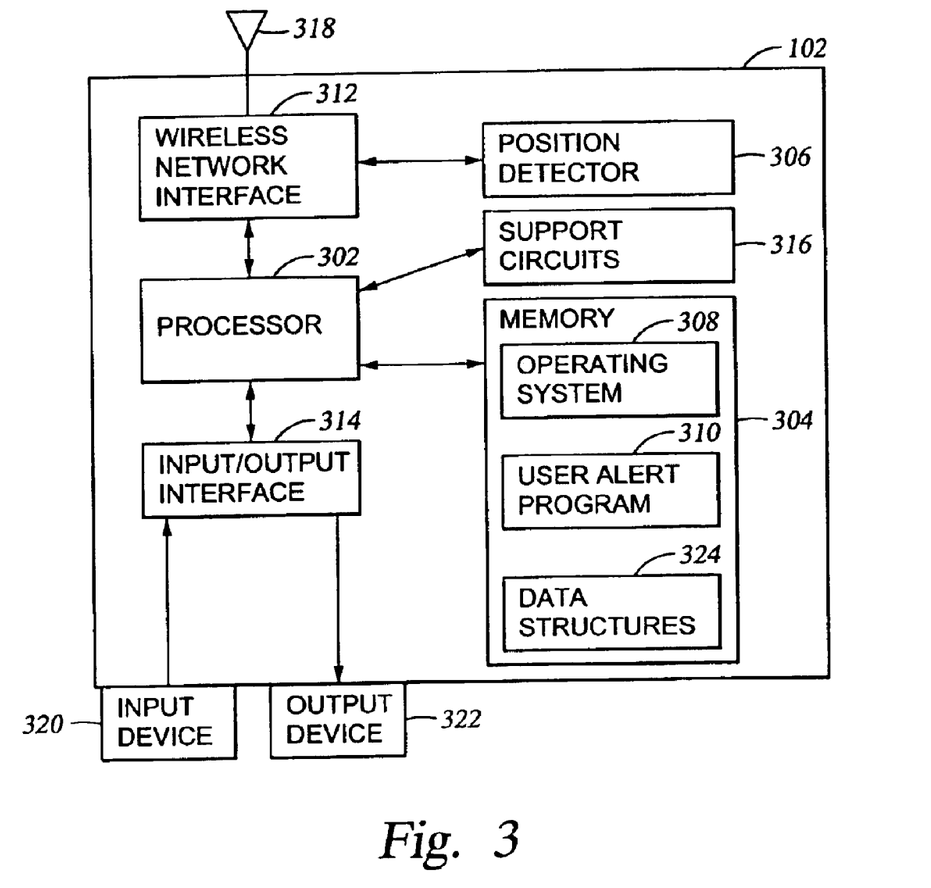
FIG. 3 depicts a block diagram of the portable communication device used in the system of FIG. 1.

FIG. 3 depicts a block diagram of one portable communication device 102A used in the communications system of FIG. 1. The following description is provided with respect to portable communication device 102A. However, the description may similarly apply to other portable communication devices, e.g., 102B. In one embodiment, the portable communication device 102 comprises a processor 302, a memory 304 and a position detector 306.

The processor 302 performs instructions based upon the requirements of the operating system 308 and a group alert program 310 stored in the memory 304. The processor 302 executes the group alert program 310 to implement the embodiments of the present invention. In one embodiment, the processor 302 receives data or information from the wireless switching office 202 and determines to notify the user (of the portable communication device 102A) when the portable communication device 102B of another group member is in the same area or region 106A. In another embodiment, the processor 302 executes commands provided from a user. In another embodiment, the processor 302 transmits information, e.g., location of the portable communication device 102A from the position detector 306, to the network 104. These embodiments are further described with respect to FIGS. 5–7.

The memory 304 stores the necessary data and programming structures 324 necessary for the operation of the portable communication device 102. The memory 304 stores the operating system 308, the user alert program 310 and other application programs (not shown). The memory 304 may comprise a combination of memory devices including random access memory (RAM), nonvolatile or backup memory (e.g., programmable or flash memories, read only memories (ROM), and the like).

The position detector 306 determines the current location or position of the portable communication device 102. In one embodiment, the position detector 306 comprises a global positioning system (GPS). The operating system 308 manages the operation of the portable communication device 102. Namely, the operating system 308 coordinates the receipt of information from the network 104, receipt of commands from the user via the input device 320, and the output of information to the output device 322 and/or the network 104. The user alert program 310 contains instructions for alerting the user of the portable communication device 102A when another group member is in the same area or region, e.g., 106A.

The network interface 312 comprises controllers to enable the portable communication device 102 to receive and transmit information in the form of radio frequency signals or data packets via the antenna 318. In one embodiment, the network interface 312 enables the reception of data packets from the wireless switching office 202 and the transmission of data packets to the wireless switching office 202. The data packets may contain contact information about the group member and the location of the portable communication device 102. One embodiment of such a data packet is further described with respect to FIG. 4.

The support circuits 316 include devices or components that support the operation of the portable communication device 102. Examples of support circuits 316 include a power supply, a clock, and the like. The input/output interface 314 comprises controllers used to couple the processor 302 to the input device 320 and the output device 322. Namely, the input/output interface 314 enables the transmission of information containing voice, text and video between the processor 302, the input device 320 and the output device 322.

The input device 320 may comprise any device utilized to provide input to the portable communication device 102. Examples of the input device 320 include a keypad, a microphone, a touch screen, a light pen, and the like. The output device 322 may comprise any device utilized to provide output for the portable communication device 102. Examples of the output device 322 include a speaker and a display. Although the output device 322 is shown separately from the input device 320, the output device 322 may be combined or integrated with the input device 320.

Figure 4:
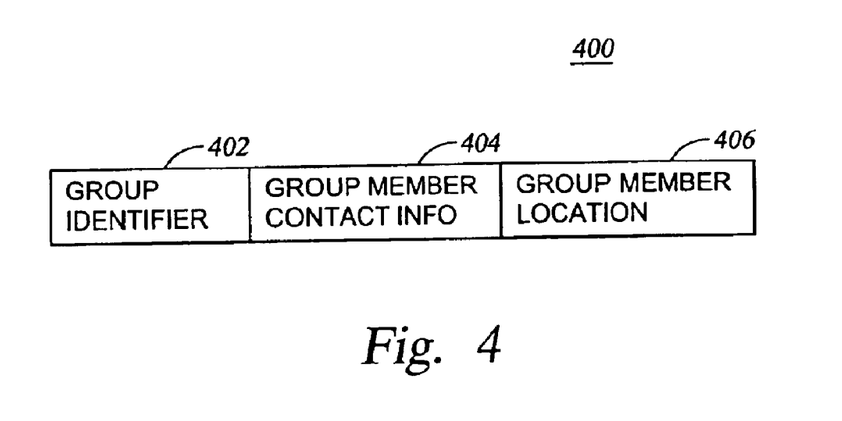
FIG. 4 depicts a format of a packet structure transmitted and received in the network of FIG. 2.

FIG. 4 depicts a format of a data packet 400 transmitted and received in the communications system 100 of FIG. 1. The data packet 400 is transmitted between the wireless switching office 202 and the wireless communication devices 102A and 102B via respective communications towers 204A and 204B. In one embodiment, the packet 400 contains information relating to a subset of users belonging to a specific group or classification. Specifically, the packet 400 comprises a group identifier field 402, a group member contact information field 404 and a group member location field 406. The group identifier field 402 identifies a specific group of group members. The group member contact information field 404 may comprise a phone number, an electronic mail address, and the like. The group member location field 406 comprises the location of the portable communication device 102 as determined using the position detector 306. Although the group identifier field 402, the group member contact information field 404, and the group member location field 406 are depicted in one data packet 400 in FIG. 4, the information herein may also be split into more than one data packet and transmitted between the wireless switching office 202 and the communication device 102 but different times.

Figure 5:
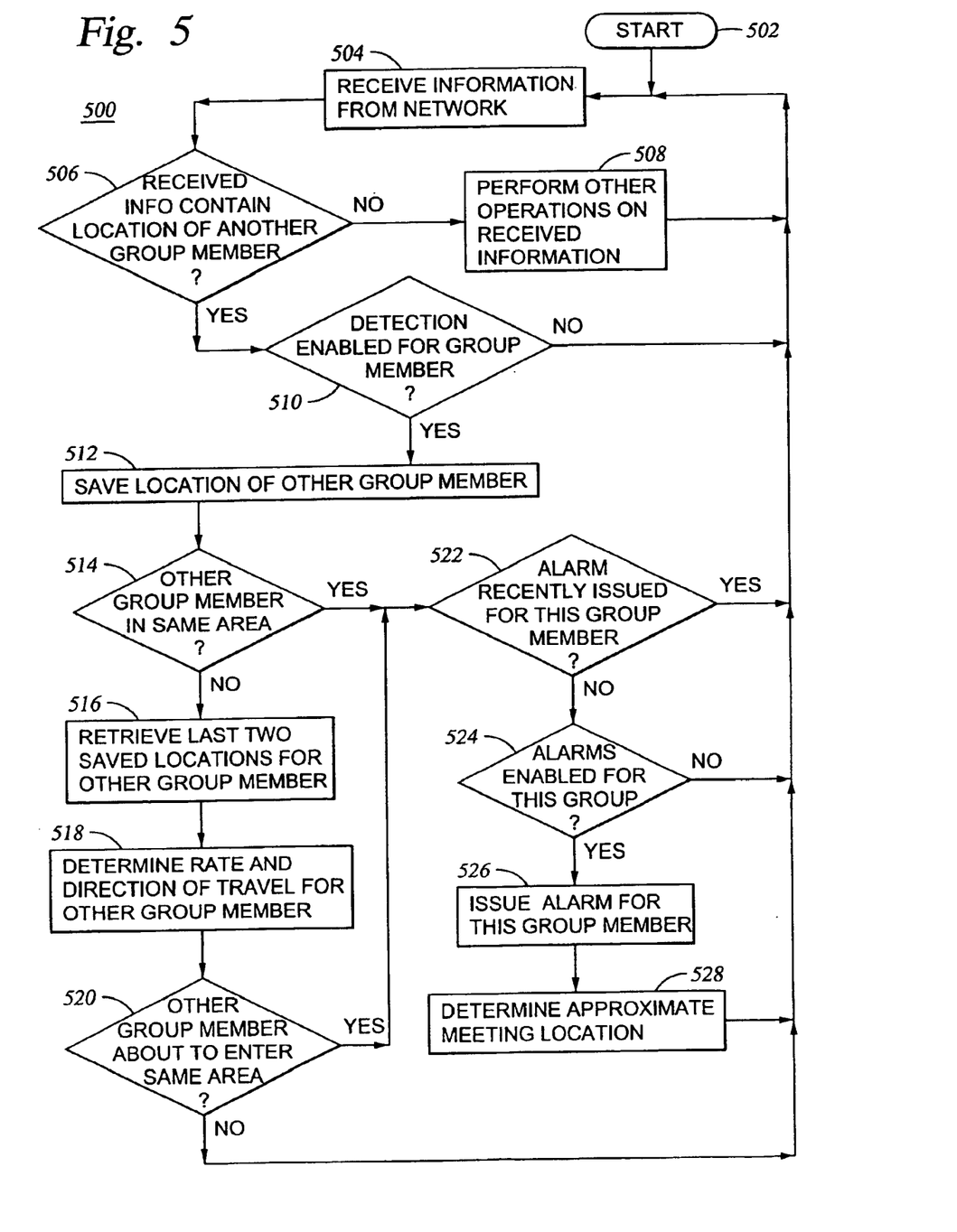
FIG. 5 depicts a flow diagram of a method for processing data received from the network.

FIG. 5 depicts a flow diagram of a method 500 for processing information received from the network 104, e.g., wireless switching office 202 of a wireless communication network. The method 500 is implemented for each group or classification containing the user of the portable communication device 102. For purposes of illustration, the method 500 is described with respect to portable communication device 102A. However, the method 500 similarly applies to the other portable communication devices, e.g., 102B, in the communications system 100.

The method 500 starts at step 502 and proceeds to step 504 where the portable communication device 102A receives information via the network 104, e.g., the wireless switching office 202 via communications tower 204A. At step 506, a query determines whether the received information contains a location of another group member, e.g., group member with portable communication device 102B. In one embodiment, step 506 may initially determine whether the received packet 400 contains information on a group member, i.e., whether the value of the group identifier field 402 is the same for the group member carrying the portable communication device 102A. If the value of the group identifier field 402 is the same as the member with the portable communication device 102A, step 506 then extracts the location of other group member from the group member location field 406.

If the received information does not contain the location of another group member, the method 500 proceeds to step 508 where other types of operations are performed on the received information. Step 508 includes but is not limited to any operation that is not related to determining the proximity of another group member. After step 508, the method 500 returns to step 504 where additional information is received from the network 104. For example, step 508 may include the reception of data packets 400 from the wireless switching office 202.

If the received data contains the location of another group member, the method 500 proceeds to step 510 where a query determines whether the group member may be detected. Namely, step 510 determines whether detection is enabled for the other group member. If the other group member may not be detected, the method 500 returns to step 504. If the other group member may be detected, the method 500 proceeds to step 512 where the location of the group member is extracted from the received information and stored in the memory 304. In one embodiment, step 512 extracts the location of the group member from the group member location field 406 of the incoming packet 400 and stores the extracted location in the memory 304.

At step 514, a query determines whether the other group member is in the same region, e.g., 106A, as the group member with the portable communication device 102A. In one embodiment, step 514 determines whether the portable communication device 102B of the other group member is within a threshold distance of the portable communication device 102A. Alternatively, step 514 may determine whether the portable communication device 102B of the other group member is in the same region or cell, e.g., 106A, as the portable communication device 102A.

If the group member is not in the same area 106A as the group member with the portable communication device 102A, the method 500 proceeds to step 516 where the last two saved locations of the other group member are retrieved from the memory 304. Step 516 is only illustrative and may include three or more locations of the portable communication device 102B. The method 500 then proceeds to step 518 where the rate and direction of travel is determined for the other group member with the portable communication device 102B. In one embodiment, step 518 is determined using the retrieved location from step 516 and the corresponding time for the location as extracted from the received data packet 400.

At step 520, a query determines whether the other group member is about to enter the same region, e.g., 106A, as the group member with the portable communication device 102A. For example, step 520 may determine whether the portable communication device 102B of the other group member will enter the same region, e.g., 106A, within a threshold amount of time. If the other group member is not about to enter the same region, e.g., 106A, the method 500 returns to step 504 where additional information from the network 104 is received.

If the other group member is about to enter the same region, e.g., 106A, the method 500 proceeds to step 522. At step 522, a query determines whether an alarm or other notification, e.g., electronic mail message, was recently issued for the presence of the other group member in the same area as the group member with the portable communication device 102A. In one embodiment, step 522 determines whether the notification was issued within a threshold amount of time. As such, step 522 provides a waiting period between successive notifications, e.g., alarms. Otherwise, step 522 would subject the user of the portable communication device 102A to multiple alarms within a short period of time.

If the notification was recently issued, the method 500 returns to step 504 where additional information from the network 104 is received. If the notification was not recently issued, the method 500 proceeds to step 524 where a query determines whether alarms are enabled for this group with the other group member. If the alarms are not enabled for this group, the method 500 returns to step 504 to receive additional information from the network 104.

If the alarms are enabled for this group, the method 500 proceeds to step 526 where the notification is issued to notify the user of the portable communication device 102A of the presence of the other group member in the same region, e.g., 106A. Types of notification may include an alarm or an electronic mail message. The method 500 proceeds to step 528 where an approximate meeting location is determined for the two group members with respective portable communication devices, e.g., 102A and 102B. After step 528, the method 500 returns to step 504 where additional information is received from the network 104.

Although FIG. 5 is described in the context of the portable communication device 102A, one having ordinary skill in the art may modify FIG. 5 for implementation in the network 104. The main difference is that the data packets 400 are directly received from the portable communication devices 102A and 102B instead of the wireless switching office 202.

Figure 6:
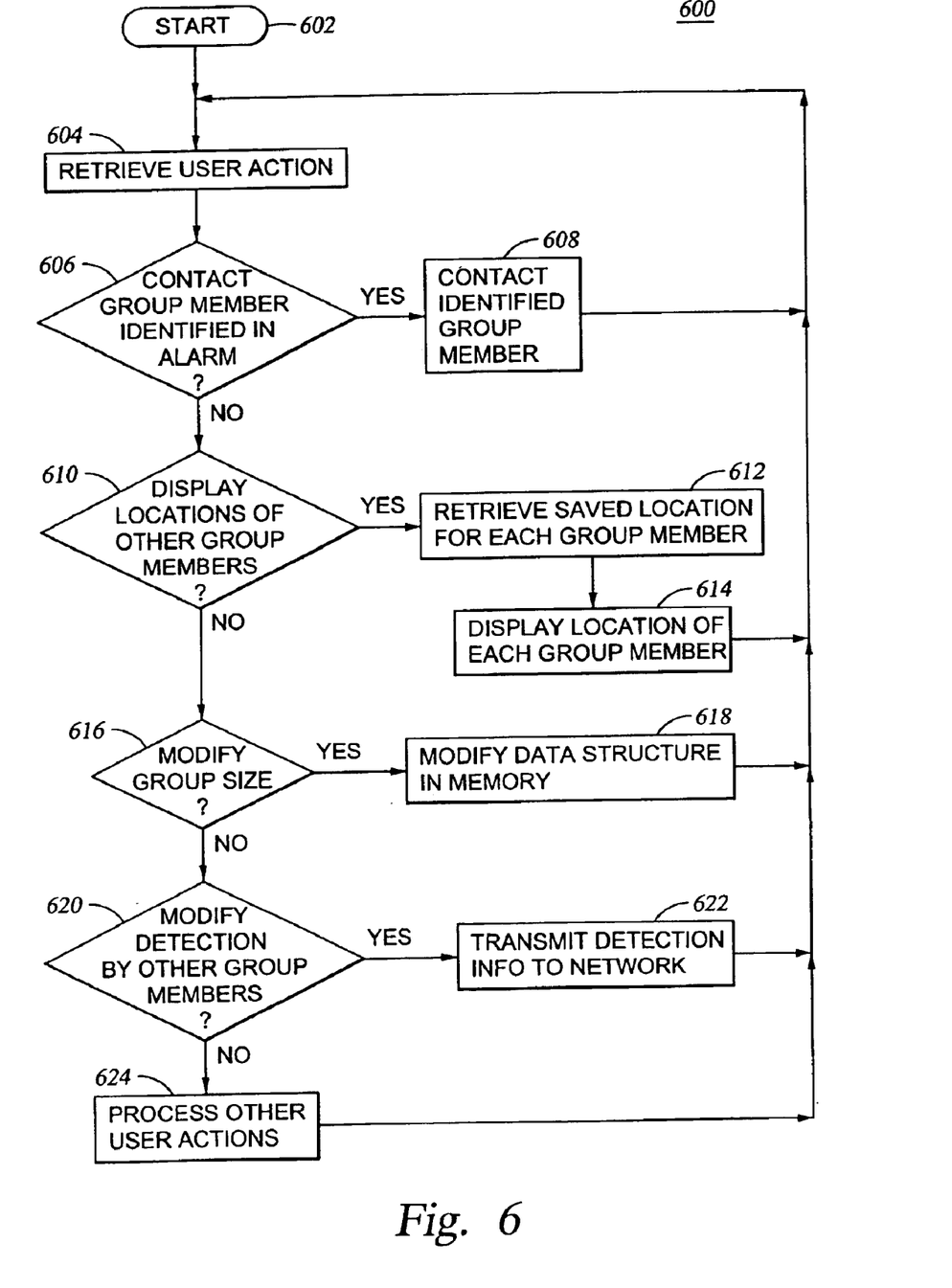
FIG. 6 depicts a flow diagram of a method for processing user input to the portable communication device.

FIG. 6 depicts a flow diagram of a method 600 for processing user input to the portable communication device 102. The method 600 is generally described with respect to any portable communication device 102, e.g., 102A or 102B. In one embodiment, the user input is provided via the input device 318. The method 600 starts at step 602 and proceeds to step 604 where a user action or command is retrieved. At step 606, a query determines whether the retrieved action is to contact the group member identified in the notification of step 526. If the user action is to contact the identified group member, the method 500 proceeds to step 608 where the identified group member is contacted. Step 608 may dial a phone number of the identified group member or send an electronic mail message to the identified group member.

If the user action is not to contact the identified group member, the method 600 proceeds to step 610 where a query determines whether the user action is a request to display the locations of other group members. If the user action is to display the locations of other group members, the method 600 proceeds to step 612 where the saved location for each group member is retrieved from the memory 304. At step 614, the method 600 then proceeds to display the location of each group member on the output device 320. After step 614, the method 600 returns to step 604 where the next user action is retrieved.

Returning to step 610, if the user action is not to display the locations of other group members, the method 600 proceeds to step 616 where a query determines whether the user action is to modify the size of the group. Namely, step 616 determines whether the user action is to add another member to the group or remove a member from the group. If the user action is to modify the size of the group, the method 600 proceeds to step 618 where data structures 324 stored in memory 304 are modified. After step 618, the method 600 returns to step 604 where the next user action is retrieved.

If the user action is not to modify the size of the group, the method 600 proceeds to step 620 where a query determines whether the user action is to modify detection by other group members. For example, a user may either enable or disable detection of the device 102 by other members of the group. If the user action is to modify detection by other group members, the method 600 proceeds to step 622 where the user action of whether to disable or enable detection is transmitted to the network 104. After step 622, the method 600 returns to step 604 where the next user action is retrieved.

If the user action is not to modify detection by other group members, the method 600 proceeds to step 624 where other user actions are processed. Examples of such user actions include calling people who are not group members or sending electronic mail messages to people who are not group members. After step 624, the method 600 returns to step 604 where the next user action is retrieved.

Figure 7:
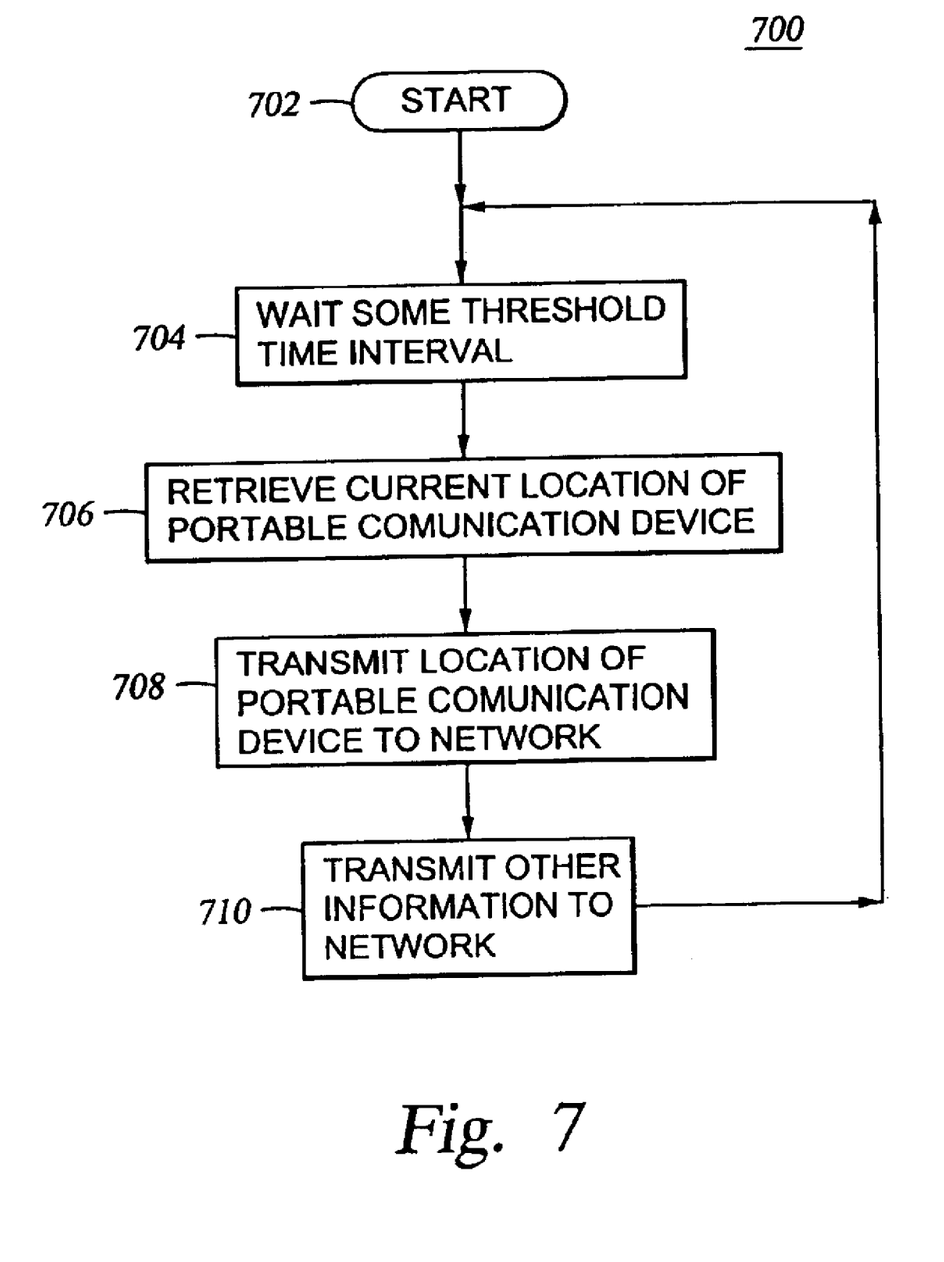
FIG. 7 depicts a flow diagram of a method for transmitting information from the portable communication device to the network.

FIG. 7 depicts a flow diagram of a method 700 for transmitting information from a portable communication device 102 to the network 100 in the communications system.100. The method 700 is described with respect to portable communication device 102A but also applies to other portable communication devices, e.g., 102B. Specifically, the method 700 starts at step 702 and proceeds to wait a threshold time interval at step 704. In one embodiment, the threshold time interval represents a delay between successive transmissions of the location of the portable communication device 102A to network 104, e.g., the Internet or the wireless switching office 202 of a wireless communications network.

The method 700 then proceeds to step 706 where the current location of the portable communication device 102A is obtained from the position detector 306, e.g., a global positioning system (GPS) device. At step 708, the method 700 transmits the retrieved location of the portable communication device 102A to the network 104. In one embodiment, the location of the portable communication device 102A is contained in the group member location field 406 of the transmitted packet 400. A portable communication device, e.g., 102B, of another group member would then receive and process this information from the wireless switching office 202. The method 700 proceeds to step 710 where other information is transmitted to the network 104. For example, if the user of the portable communication device 102A wishes to avoid detection by users of other portable communication devices, e.g., 102B, then such information may be transmitted to the network 104. After step 710, the method 700 returns to step 704.

Although various embodiments which incorporate the teachings of the present invention have been shown and described in detail herein, those skilled in the art can readily devise many other varied embodiments that still incorporate these teachings. In other embodiments, various components of the present invention may be implemented in whole or in part on a server computer located at the network switching office 202. Peer-to-peer embodiments are also within the scope of the present invention. Therefore, it is desired that the embodiments described herein be considered in all respects as illustrative, not restrictive, and that reference be made to the appended claims for determining the scope of the invention.

What is claimed is:

1. A method for notifying a user of a portable communication device, the method of comprising:

determining a location of a first portable communication device of a first user;

determining a location of a second portable communication device of a second user;

determining whether the location of the second portable communication device is within a same region containing the first portable communication device;

notifying the first user of a presence of the second user if the location of the second portable communication device is within the same region containing the first portable communication device;

determining a common meeting point for the first and second users;

notifying the first user of the common meeting point on the first portable communication device; and notifying the second user of the common meeting point on the second portable communication device.

2. A method for notifying a user of a portable communication device, the method comprising:

determining whether a first user is in a group for a second user, the group being predefined and stored in a storage device;

if so, determining whether the second user has permission to location the first user;

if so, determining an approximate geographical location of the first portable communication device of the first user;

notifying the second user of the approximate geographical location of the first user;

determining a common meeting point; and notifying the first user of the common meeting point on the first portable communication device.

3. A method for notifying a user of a portable communication device, the method comprising:

determining a location of a first portable communication device of a first user;

determining a location of a second portable communication device of a second user;

determining whether the first user has permission to locate the second user;

if so, determining whether the location of the second portable communication device is within a same region containing the first portable communication device;

if so, notifying the first user of the location of the second portable communication device of the second user;

determining a common meeting point for the first and second users;

notifying the first user of the common meeting point on the first portable communication device; and notifying the second user of the common meeting point on the second portable communication device.

* * * * *